(12) United States Patent
Wang et al.

(10) Patent No.: US 9,390,170 B2
(45) Date of Patent: Jul. 12, 2016

(54) METHODS AND SYSTEMS FOR ARRANGING AND SEARCHING A DATABASE OF MEDIA CONTENT RECORDINGS

(71) Applicant: Shazam Investments Limited, London (GB)

(72) Inventors: Avery Li-Chun Wang, Palo Alto, CA (US); Ira Joseph Woodhead, San Francisco, CA (US); Erich Konrad Elsen, Redwood City, CA (US)

(73) Assignee: Shazam Investments Ltd., London (GB)

( * ) Notice: Subject to any disclaimer, the term of this patent is extended or adjusted under 35 U.S.C. 154(b) by 391 days.

(21) Appl. No.: 13/837,284

(22) Filed: Mar. 15, 2013

(65) Prior Publication Data

US 2014/0280233 A1 Sep. 18, 2014

(51) Int. Cl.
*G06F 17/30* (2006.01)
(52) U.S. Cl.
CPC .... *G06F 17/30784* (2013.01); *G06F 17/30758* (2013.01)
(58) Field of Classification Search
CPC ............... G06F 17/30864; G06F 17/30038; G06F 17/30247; G06F 17/30799; G06F 17/30825; G06F 17/30743
See application file for complete search history.

(56) References Cited

U.S. PATENT DOCUMENTS

| 4,450,531 | A | 5/1984 | Kenyon et al. |
| 4,843,562 | A | 6/1989 | Kenyon et al. |
| 5,134,719 | A | 7/1992 | Mankovitz |
| 5,333,275 | A | 7/1994 | Wheatley et al. |
| 5,437,050 | A | 7/1995 | Lamb et al. |
| 5,465,240 | A | 11/1995 | Mankovitz |
| 5,649,060 | A | 7/1997 | Ellozy et al. |
| 5,674,743 | A | 10/1997 | Ulmer |
| 5,740,230 | A | 4/1998 | Vaudreuil |

(Continued)

FOREIGN PATENT DOCUMENTS

WO     WO02/27600     4/2002

OTHER PUBLICATIONS

Clausen et al., "A Unified Approach to Content-Based and Fault-Tolerant Music Recognition", IEEE Transactions on Multimedia, vol. 6, No. 5, Oct. 1, 2004, pp. 717-731.

(Continued)

*Primary Examiner* — Angelica Ruiz
(74) *Attorney, Agent, or Firm* — McDonnell Boehnen Hulbert & Berghoff LLP

(57) ABSTRACT

Methods and systems for arranging and searching a database of media content recordings are provided. In one example, a method is provided that comprises receiving a sample of media content, and performing, by a computing device, a content recognition of the sample of media content using a data file including a concatenation of representations for each of a plurality of media content recordings. In other examples, another method is provided that comprises receiving media content recordings, determining a representation for each media content recording, concatenating by a computing device the representation for each media content recording as a data file, and storing by the computing device a mapping between an identifier for a respective media content recording and a global position in the data file that corresponds to the representation of the respective media content recording.

38 Claims, 5 Drawing Sheets

(56) References Cited

U.S. PATENT DOCUMENTS

| | | | |
|---|---|---|---|
| 5,918,223 | A | 6/1999 | Blum et al. |
| 5,952,597 | A | 9/1999 | Weinstock et al. |
| 6,107,559 | A | 8/2000 | Weinstock et al. |
| 6,166,314 | A | 12/2000 | Weinstock et al. |
| 6,476,306 | B2 | 11/2002 | Huopaniemi et al. |
| 6,766,523 | B2 | 7/2004 | Herley |
| 6,792,007 | B1 | 9/2004 | Hamada et al. |
| 6,911,592 | B1 | 6/2005 | Futamase |
| 6,966,065 | B1 | 11/2005 | Kitazato et al. |
| 6,990,453 | B2 | 1/2006 | Wang et al. |
| 7,174,293 | B2 | 2/2007 | Kenyon |
| 7,190,971 | B1 | 3/2007 | Kawamoto |
| 7,194,752 | B1 | 3/2007 | Kenyon et al. |
| 7,277,766 | B1 | 10/2007 | Khan et al. |
| 7,444,353 | B1 | 10/2008 | Chen et al. |
| 7,461,392 | B2 | 12/2008 | Herley |
| 7,523,474 | B2 | 4/2009 | Herley |
| 7,549,052 | B2 | 6/2009 | Haitsma et al. |
| 7,627,477 | B2 | 12/2009 | Wang |
| 7,653,921 | B2 | 1/2010 | Herley |
| 7,788,279 | B2 | 8/2010 | Mohajer et al. |
| 7,831,531 | B1* | 11/2010 | Baluja et al. ............... 706/25 |
| 7,849,131 | B2 | 12/2010 | Van de Sluis |
| 8,386,258 | B2* | 2/2013 | Wang et al. ............... 704/270 |
| 8,452,586 | B2 | 5/2013 | Master et al. |
| 8,516,275 | B2* | 8/2013 | Sato ............... H04N 5/783 380/269 |
| 2002/0072982 | A1 | 6/2002 | Barton et al. |
| 2002/0083060 | A1 | 6/2002 | Wang et al. |
| 2004/0266337 | A1 | 12/2004 | Radcliffe et al. |
| 2005/0086682 | A1 | 4/2005 | Burges et al. |
| 2005/0267817 | A1 | 12/2005 | Barton et al. |
| 2006/0112812 | A1 | 6/2006 | Venkataraman et al. |
| 2006/0246408 | A1 | 11/2006 | Gao |
| 2007/0143777 | A1 | 6/2007 | Wang |
| 2007/0166683 | A1 | 7/2007 | Chang et al. |
| 2008/0025554 | A1* | 1/2008 | Landwehr et al. ............ 382/100 |
| 2008/0046406 | A1* | 2/2008 | Seide ............... G06F 17/30743 |
| 2008/0097754 | A1 | 4/2008 | Goto et al. |
| 2008/0115655 | A1 | 5/2008 | Weng et al. |
| 2008/0187188 | A1* | 8/2008 | Beletski et al. ............... 382/124 |
| 2008/0196575 | A1 | 8/2008 | Good |
| 2008/0209502 | A1* | 8/2008 | Seidel ............................... 726/1 |
| 2008/0263360 | A1 | 10/2008 | Haitsma et al. |
| 2009/0083281 | A1 | 3/2009 | Sarig et al. |
| 2010/0050853 | A1 | 3/2010 | Jean et al. |
| 2010/0145708 | A1 | 6/2010 | Master et al. |
| 2010/0211693 | A1 | 8/2010 | Master et al. |
| 2010/0247060 | A1 | 9/2010 | Gay et al. |
| 2010/0268359 | A1 | 10/2010 | Prestenback et al. |
| 2011/0173208 | A1* | 7/2011 | Vogel ............................ 707/746 |
| 2012/0029670 | A1 | 2/2012 | Mount-Reynaud et al. |
| 2012/0221131 | A1* | 8/2012 | Wang et al. ...................... 700/94 |
| 2012/0239175 | A1 | 9/2012 | Mohajer et al. |
| 2013/0254422 | A2* | 9/2013 | Master ............. G06F 17/30743 709/238 |

OTHER PUBLICATIONS

Ellis, "Audfprint—Audio fingerprint database creation + query", MATlab Online Resources, Mar. 7, 2013, p. 1-16, retrieved from internet: URL:http://web.archive.org/web/20130307205230/http://labrosa.ee.columbia.edu/matlab/audfprint.

Wang, "An Industrial-Strength Audio Speech Algorithm", Proceedings of the 4th International Conference on Music Information Retrieval, Baltimore, MA, Oct. 23, 2003.

Fenet et al., "A framework for fingerprint-based detection of repeating objects in multimedia streams", Signal Processing Conference (EUSIPCO), 2012 Proceedings of the 20th European, IEEE, Aug. 27, 2012, pp. 1464-1468.

International Search Report and Written Opinion prepared by the European Patent Office in International Patent Application Serial No. PCT/2014/024117, mailed Jul. 17, 2014.

Kim et al., "Music Emotion Recognition: A state of the Art Review", 11th International Society for Music Information Retrieval Conference (2010).

Vy et al., "EnACT: A software tool for creating animated text captions", ICCHP 2008, LNCS 5105, pp. 609-616 (2008).

Geleijnse et al., "Enriching Music with Synchronized Lyrics, Images, and Colored Lights", Ambi-Sys'08, Feb. 11-14, 2008, Quebec, Canada.

Shi-Kuo Chang, Zen Chen, Suh-Yin Lee / Oostveen, J., et al., "Recent Advances in Visual Information Systems", 5th International Conference, Visual 2002, "Feature Extraction and a Database Strategy for Video Fingerprinting", Lecture Notes in Computer Science, 2314, (Mar. 11, 2002), 117-128.

Macrae et al., "MuViSync: Realtime Music Video Alignment", available from http://www.xavieranguera.com/papers/icme2010.pdf, at least on Dec. 2, 2010.

Kan et al., "LyricAlly: Automatic Synchronization of Textual Lyrics to Acoustic Music Signals", IEEE Transactions on Audio, Speech and Language Processing, vol. 16, No. 2, Feb. 2008, pp. 338-349.

Mesaros, "Automatic Alignment of Music Audio and Lyrics", Proc. of the 11th Int. Conference on Digital Audio Effects (DAFx-08), Espoo, Finland, Sep. 1-4, 2008, pp. DAFX-1-4.

Young et al., The HTK Book (for HTK Version 3.4), first published Dec. 1995.

Fujihara et al., "Three Techniques for Improving Automatic Synchronization Between Music and Lyrics: Fricative Detection, Filler, Model, and Novel Feature Vectors for Vocal Activity Detection", National Institute of Advanced Industrial Science and Technology, 2008, pp. 69-72.

Fujihara et al., "Automatic Synchronization Between Lyrics and Music CD Recordings based on Viterbi Alignment of Segragated Vocal Signals", Proceedings of the Eighth IEEE International Symposium on Multimedia, 2006.

http://waltdisneyworldflorida.net/walt-disney-news/walt-disney-tron-bambi-to-employ-disneys-second-screen-technology-on-dvd-blu-ray/, visited and printed from Internet May 4, 2011.

http://www.razorianfly.com/2011/02/12/details-on-tron-legacy-for-blu-ray-surface-disneys-second-screen-for-ipad/, visited and printed from Internet on May 4, 2011.

International Search Report and Written Opinion prepared by the European Patent Office in International Patent Application PCT/US2011/035197, mailed Aug. 29, 2011.

International Preliminary Report on Patentability and Written Opinion prepared by the European Patent Office in International Patent Application PCT/US2011/035197, mailed Nov. 15, 2012.

International Preliminary Report on Patentability and Written Opinion prepared by the European Patent Office in International Patent Application Serial No. PCT/2014/024117, mailed Sep. 24, 2015.

* cited by examiner

METHODS AND SYSTEMS FOR ARRANGING AND SEARCHING A DATABASE OF MEDIA CONTENT RECORDINGS

BACKGROUND

Media content identification from environmental samples is a valuable and interesting information service. User-initiated or passively-initiated content identification of media samples has presented opportunities for users to connect to target content of interest including music and advertisements.

Content identification systems for various data types, such as audio or video, use many different methods. A client device may capture a media sample recording of a media stream (such as radio), and may then request a server to perform a search of media recordings (also known as media tracks) for a match to identify the media stream. For example, the sample recording may be passed to a content identification server module, which can perform content identification of the sample and return a result of the identification to the client device. A recognition result may then be displayed to a user on the client device or used for various follow-on services, such as purchasing or referencing related information. Other applications for content identification include broadcast monitoring, for example.

Existing procedures for ingesting target content into a database index for automatic content identification include acquiring a catalog of content from a content provider or indexing a database from a content owner. Furthermore, existing sources of information to return to a user in a content identification query are obtained from a catalog of content prepared in advance.

SUMMARY

In one example, a method is provided that comprises receiving a sample of media content, and performing, by a computing device, a content recognition of the sample of media content using a data file including a concatenation of representations for each of a plurality of media content recordings.

In other examples, a non-transitory computer readable medium having stored therein instructions, that when executed by a computing device, cause the computing device to perform functions. The functions may comprise receiving a sample of media content, and performing, by a computing device, a content recognition of the sample of media content using a data file including a concatenation of representations for each of a plurality of media content recordings.

In still another example, a system is provided that comprises at least one processor, and data storage configured to store instructions that when executed by the at least one processor cause the system to perform functions. The functions may comprise receiving a sample of media content, and performing, by a computing device, a content recognition of the sample of media content using a data file including a concatenation of representations for each of a plurality of media content recordings.

In other examples, another method is provided that comprises receiving media content recordings, determining a representation for each media content recording, concatenating, by a computing device, the representation for each media content recording as a data file, and storing, by the computing device, a mapping between an identifier for a respective media content recording and a global position in the data file that corresponds to the representation of the respective media content recording.

In further examples, a non-transitory computer readable medium having stored therein instructions, that when executed by a computing device, cause the computing device to perform functions. The functions may comprise receiving media content recordings, determining a representation for each media content recording, concatenating, by a computing device, the representation for each media content recording as a data file, and storing, by the computing device, a mapping between an identifier for a respective media content recording and a global position in the data file that corresponds to the representation of the respective media content recording.

In still further examples, a system is provided that comprises at least one processor, data storage configured to store instructions that when executed by the at least one processor cause the system to perform functions. The functions may comprise receiving media content recordings, determining a representation for each media content recording, concatenating, by a computing device, the representation for each media content recording as a data file, and storing, by the computing device, a mapping between an identifier for a respective media content recording and a global position in the data file that corresponds to the representation of the respective media content recording.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Figure 1:
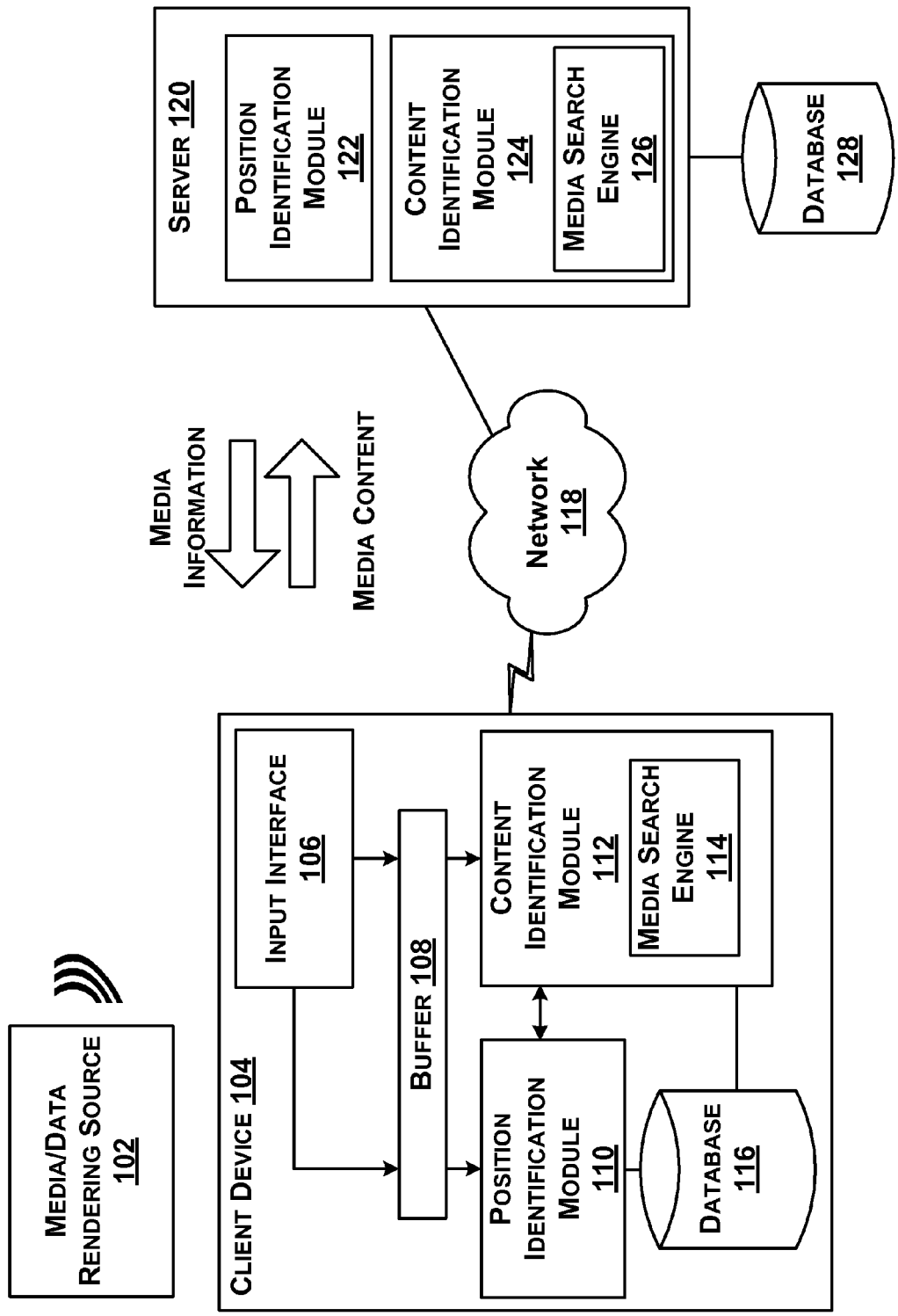
FIG. 1 illustrates one example of a system for identifying content within a data stream and for determining information associated with the identified content.

Referring now to the figures, FIG. 1 illustrates one example of a system for identifying content within a data stream and for determining information associated with the identified content. While FIG. 1 illustrates a system that has a given configuration, the components within the system may be arranged in other manners. The system includes a media or data rendering source 102 that renders and presents content from a media stream in any known manner. The media stream may be stored on the media rendering source 102 or received from external sources, such as an analog or digital broadcast. In one example, the media rendering source 102 may be a radio station or a television content provider that broadcasts media streams (e.g., audio and/or video) and/or other information. The media rendering source 102 may also be any type of device that plays or audio or video media in a recorded or live format. In an alternate example, the media rendering source 102 may include a live performance as a source of audio and/or a source of video, for example. The media rendering source 102 may render or present the media stream through a graphical display, audio speakers, a MIDI musical instrument, an animatronic puppet, etc., or any other kind of presentation provided by the media rendering source 102, for example.

A client device 104 receives a rendering of the media stream from the media rendering source 102 through an input interface 106. In one example, the input interface 106 may include antenna, in which case the media rendering source 102 may broadcast the media stream wirelessly to the client device 104. However, depending on a form of the media stream, the media rendering source 102 may render the media using wireless or wired communication techniques. In other examples, the input interface 106 can include any of a microphone, video camera, vibration sensor, radio receiver, network interface, etc. The input interface 106 may be preprogrammed to capture media samples continuously without user intervention, such as to record all audio received and store recordings in a buffer 108. The buffer 108 may store a number of recordings, or may store recordings for a limited time, such that the client device 104 may record and store recordings in predetermined intervals, for example, or in a way so that a history of a certain length backwards in time is available for analysis. In other examples, capturing of the media sample may be caused or triggered by a user activating a button or other application to trigger the sample capture.

The client device 104 can be implemented as a portion of a small-form factor portable (or mobile) electronic device such as a cell phone, a wireless cell phone, a personal data assistant (PDA), tablet computer, a personal media player device, a wireless web-watch device, a personal headset device, an application specific device, or a hybrid device that include any of the above functions. The client device 104 can also be implemented as a personal computer including both laptop computer and non-laptop computer configurations. The client device 104 can also be a component of a larger device or system as well.

The client device 104 further includes a position identification module 110 and a content identification module 112. The position identification module 110 is configured to receive a media sample from the buffer 108 and to identify a corresponding estimated time position ($T_S$) indicating a time offset of the media sample into the rendered media stream (or into a segment of the rendered media stream) based on the media sample that is being captured at that moment. The time position ($T_S$) may also, in some examples, be an elapsed amount of time from a beginning of the media stream. For example, the media stream may be a radio broadcast, and the time position ($T_S$) may correspond to an elapsed amount of time of a song being rendered.

The content identification module 112 is configured to receive the media sample from the buffer 108 and to perform a content identification on the received media sample. The content identification identifies a media stream, or identifies information about or related to the media sample. The content identification module 112 may be configured to receive samples of environmental audio, identify a content of the audio sample, and provide information about the content, including the track name, artist, album, artwork, biography, discography, concert tickets, etc. In this regard, the content identification module 112 includes a media search engine 114 and may include or be coupled to a database 116 that indexes reference media streams, for example, to compare the received media sample with the stored information so as to identify tracks within the received media sample. The database 116 may store content patterns that include information to identify pieces of content. The content patterns may include media recordings such as music, advertisements, jingles, movies, documentaries, television and radio programs. Each recording may be identified by a unique identifier (e.g., sound_ID). Alternatively, the database 116 may not necessarily store audio or video files for each recording, since the sound_IDs can be used to retrieve audio files from elsewhere. The database 116 may yet additionally or alternatively store representations for multiple media content recordings as a single data file where all media content recordings are concatenated end to end to conceptually form a single media content recording, for example. The database 116 may include other information (in addition to or rather than media recordings), such as reference signature files including a temporally mapped collection of features describing content of a media recording that has a temporal dimension corresponding to a timeline of the media recording, and each feature may be a description of the content in a vicinity of each mapped timepoint. For more examples, the reader is referred to U.S. Pat. No. 6,990,453, by Wang and Smith, which is hereby entirely incorporated by reference.

The database 116 may also include information associated with stored content patterns, such as metadata that indicates information about the content pattern like an artist name, a length of song, lyrics of the song, time indices for lines or words of the lyrics, album artwork, or any other identifying or related information to the file. Metadata may also comprise data and hyperlinks to other related content and services, including recommendations, ads, offers to preview, bookmark, and buy musical recordings, videos, concert tickets, and bonus content; as well as to facilitate browsing, exploring, discovering related content on the world wide web.

The system in FIG. 1 further includes a network 118 to which the client device 104 may be coupled via a wireless or wired link. A server 120 is provided coupled to the network 118, and the server 120 includes a position identification module 122 and a content identification module 124. Although FIG. 1 illustrates the server 120 to include both the position identification module 122 and the content identification module 124, either of the position identification module 122 and/or the content identification module 124 may be separate entities apart from the server 120, for example. In addition, the position identification module 122 and/or the content identification module 124 may be on a remote server connected to the server 120 over the network 118, for example.

The server 120 may be configured to index target media content rendered by the media rendering source 102. For example, the content identification module 124 includes a media search engine 126 and may include or be coupled to a database 128 that indexes reference or known media streams, for example, to compare the rendered media content with the stored information so as to identify content within the rendered media content. The database 128 (similar to database 116 in the client device 104) may additionally or alternatively store multiple media content recordings as a single data file where all the media content recordings are concatenated end to end to conceptually form a single media content recording. A content recognition can then be performed by compared rendered media content with the data file to identify matching content using a single search. Once content within the media stream have been identified, identities or other information may be indexed in the database 128.

In some examples, the client device 104 may capture a media sample and may send the media sample over the network 118 to the server 120 to determine an identity of content in the media sample. In response to a content identification query received from the client device 104, the server 120 may identify a media recoding from which the media sample was obtained based on comparison to indexed recordings in the database 128. The server 120 may then return information identifying the media recording, and other associated information to the client device 104.

Figure 2:
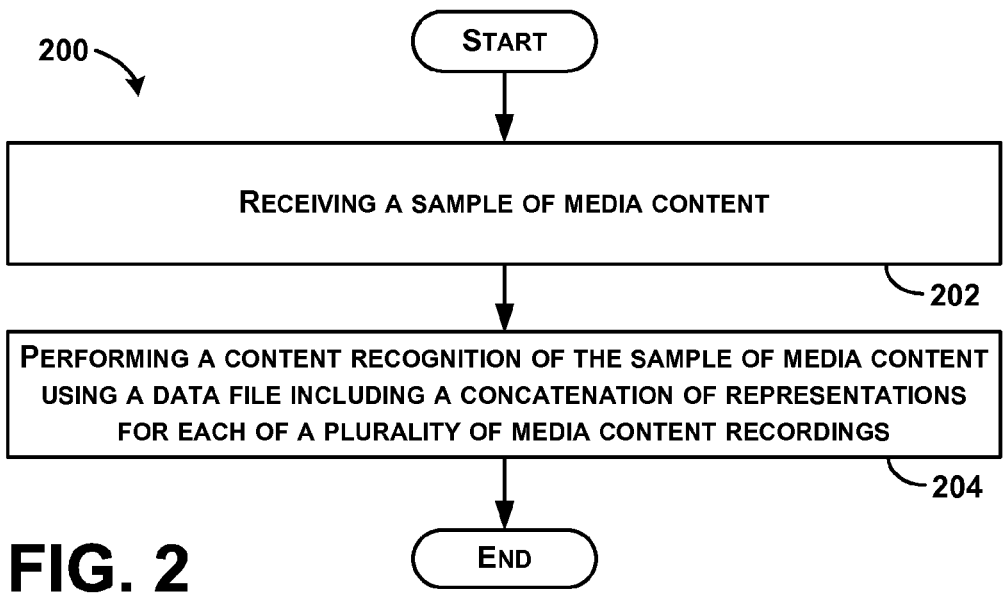
FIG. 2 shows a flowchart of an example method for performing content recognitions.

FIG. 2 shows a flowchart of an example method 200 for performing content recognitions. Method 200 shown in FIG. 2 presents an embodiment of a method that, for example, could be used with the system shown in FIG. 1, for example, and may be performed by a computing device (or components of a computing device) such as a client device or a server or may be performed by components of both a client device and a server. Method 200 may include one or more operations, functions, or actions as illustrated by one or more of blocks 202-204. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in FIG. 2 may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 202, the method 200 includes receiving a sample of media content. As one example, a computing device may receive the sample of media content from an ambient environment of the computing device, such as via a microphone, receiver, etc., and may record and store the sample. In another example, the computing device may receive the sample of media content from another computing device (e.g., one computing device records the sample and sends the sample to a server).

At block 204, the method 200 includes performing a content recognition of the sample of media content using a data file including a concatenation of representations for each of a plurality of media content recordings. The concatenation may include a plurality of respective representations (e.g., fingerprints or set of fingerprints) per media content recording and arranged in sequential time order per media content recording in the data file. A representation for a given media content recording may include a set of fingerprints determined or extracted at respective landmark positions within the given media content recording, and each fingerprint corresponds to a global position within the data file. The data file also may have associated identifiers per groupings of representations (e.g., per sets of fingerprints) for each of the plurality of media content recordings. In an example where the media content recordings include songs, the identifiers may include any of a title of a song, an artist, genre, etc.

In one example, the content recognition can be performed by determining a representation in the data file that matches to a portion of the sample of media content, and then to identify a mapping between the matching portion in the data file and an identifier for a respective media content recording. The mapping may be between a global position of the representation in the data file and the identifier.

Thus, within examples, the content recognition may be performed by identifying within the data file a substantially matching representation to a respective representation of the sample of media content, and then determining a global position in the data file corresponding to the substantially matching representation. The representations for each of the plurality of media content recordings in the data file have associated global starting positions within the data file so as to segment a global timeline of the data file according to the plurality of media content recordings. A global starting position in the data file associated with the substantially matching representation at the determined global position can also be identified. The method 200 may also include determining a local position within a given media content recording corresponding to the sample of media content based on the global position and the global starting position.

Within examples, using the method 200, a large database of media recordings may be searched using a single bucket (instead of separate buckets indexed by a sound_ID) to obtain enhanced recognition performance with simplified data processing structures. Existing search techniques may process search data by separating matching data into different buckets, and each bucket corresponds to a distinct target object. Within examples herein, it may be more efficient not to distribute data into separate buckets, but rather to process unseparated data in a single bulk operation. By performing a single search operation of a received sample of media content into a database for content recognition, overhead processing due to distribution and tracking of bucket indices and iterating over buckets may be removed. Thus, within examples, a method of aggregating searches in which one bulk operation carried out on a single concatenated media content recording may be more efficient than a number of small operations.

Example Database Setup

In some examples, a reference database of media content recordings to use to identify unknown media content may include a concatenation of representations of all known media content recordings into a single concatenated media recording file that has a single concatenated timeline, in which associated identifiers may not be directly referenced in the file. Each media content recording can be represented as being located along the concatenated timeline at a given position, and boundaries of the recordings can be stored to translate an identified position in the file to an identifier.

The representations of the media content recordings may be any number or type of data. As one example, the representations may include a set of fingerprints for each media content recording.

Figure 3:
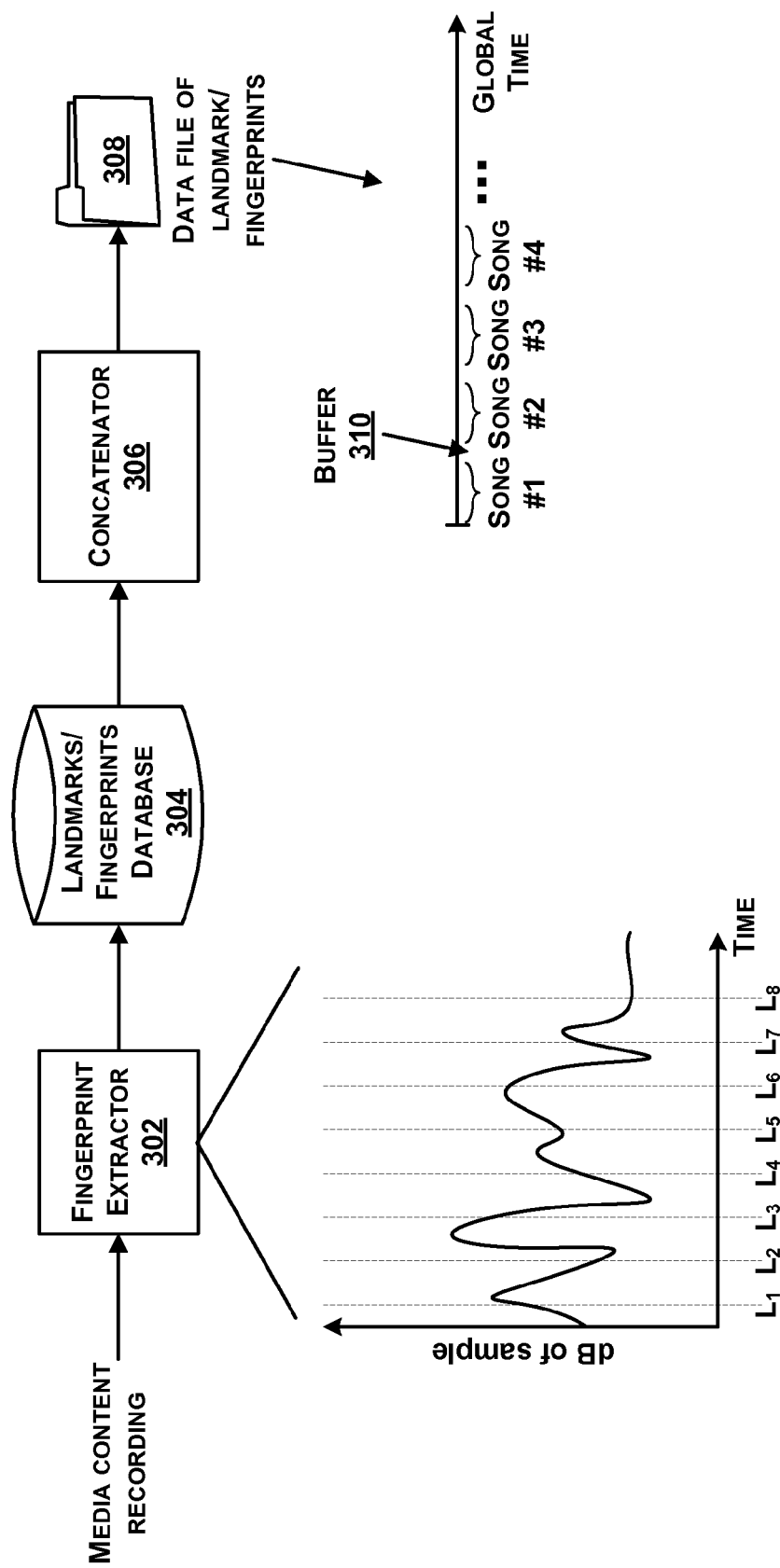
FIG. 3 illustrates a diagram of an example method to form a concatenation of representations of media content recordings.

FIG. 3 illustrates a diagram of an example method to form a concatenation of representations of media content recordings. Generally, media content can be identified by computing characteristics or fingerprints of a media sample and comparing the fingerprints to previously identified fingerprints of reference media files. Particular locations within the sample at which fingerprints are computed may depend on reproducible points in the sample. Such reproducibly computable locations are referred to as "landmarks." One landmarking technique, known as Power Norm, is to calculate an instantaneous power at many time points in the recording and to select local maxima. One way of doing this is to calculate an envelope by rectifying and filtering a waveform directly. FIG. 3 illustrates a media content recording being input to a fingerprint extractor 302 (or fingerprint generator) that is configured to determine fingerprints of the media content recording. An example plot of dB (magnitude) of a sample vs. time is shown, and the plot illustrates a number of identified landmark positions ($L_1$ to $L_8$). Once the landmarks have been determined, the fingerprint extractor 302 is configured to compute a fingerprint at or near each landmark time point in the recording. The fingerprint is generally a value or set of values that summarizes a set of features in the recording at or near the landmark time point. In one example, each fingerprint is a single numerical value that is a hashed function of multiple features. Other examples of fingerprints include spectral slice fingerprints, multi-slice fingerprints, LPC coefficients, cepstral coefficients, and frequency components of spectrogram peaks.

The fingerprint extractor 302 may generate a set of fingerprints each with a corresponding landmark and provide the fingerprint/landmark pairs for each media content recording to a database 304 for storage. The fingerprints are then represented in the database 304 as key-value pairs where the key is the fingerprint and the value is a corresponding landmark. A value may also have an associated sound_ID within the database 304, for example. Media recordings can be indexed with sound_ID from 0 to N−1, where N is a number of media recordings.

A concatenator 306 may retrieve the fingerprint/landmark pairs for each media content recording and maintain the fingerprints per recording in time order based on the landmarks for that recording so as to create a time ordered fingerprint set for each recording. The concatenator 306 then joins the fingerprint sets for all recordings end to end into a single data file 308 that has a conceptual timeline or global time.

A mapping can be created between each sound_ID and a corresponding global position in the data file 308. In addition, a list of global starting positions for each original media recording within the concatenated media recording data file is stored to create a reverse mapping from each global position to a corresponding local position in an original media recording indexed by a sound_ID. The global starting positions thus segment the global timeline according to the original media recordings.

Thus, to determine a local position of a sample of media within the global timeline, a global position in the timeline as well as a global start position of the media recording is determined according to Equation 1.

$$\text{local position} = \text{global position} - \text{global start position [sound\_ID]} \quad \text{Equation (1)}$$

Thus, to determine a local position of a sample of media within the global timeline, a global position in the timeline as well as a global start position of the media recording is determined according to Equation 1. As an example, to map from a global position to a sound_ID and local position, the global start positions are searched for an interval containing the global position, i.e., find a sound_ID where:

$$\text{global start position[sound\_ID]} \leq \text{global position} < \text{global start position[sound\_ID+1]} \quad \text{Equation (2)}$$

A mapping can be created between each sound_ID and a corresponding global position in the data file 308. In addition, a list of global starting positions for each original media recording within the concatenated media recording data file is stored to create a reverse mapping from each global position to a corresponding local position in an original media recording indexed by a sound_ID. The global starting positions thus segment the global timeline according to the original media recordings.

Thus, within examples, the data file 308 conceptually represents a K-V database where each key K is a fingerprint and the value V comprises a global position corresponding to a landmark position of the fingerprint. In some examples, a buffer (e.g., blank space of several seconds worth of timeline) may be inserted between adjacent recordings to provide for distinct boundaries between recordings, and to make it less ambiguous which recording is a match during a search process.

Figure 4:
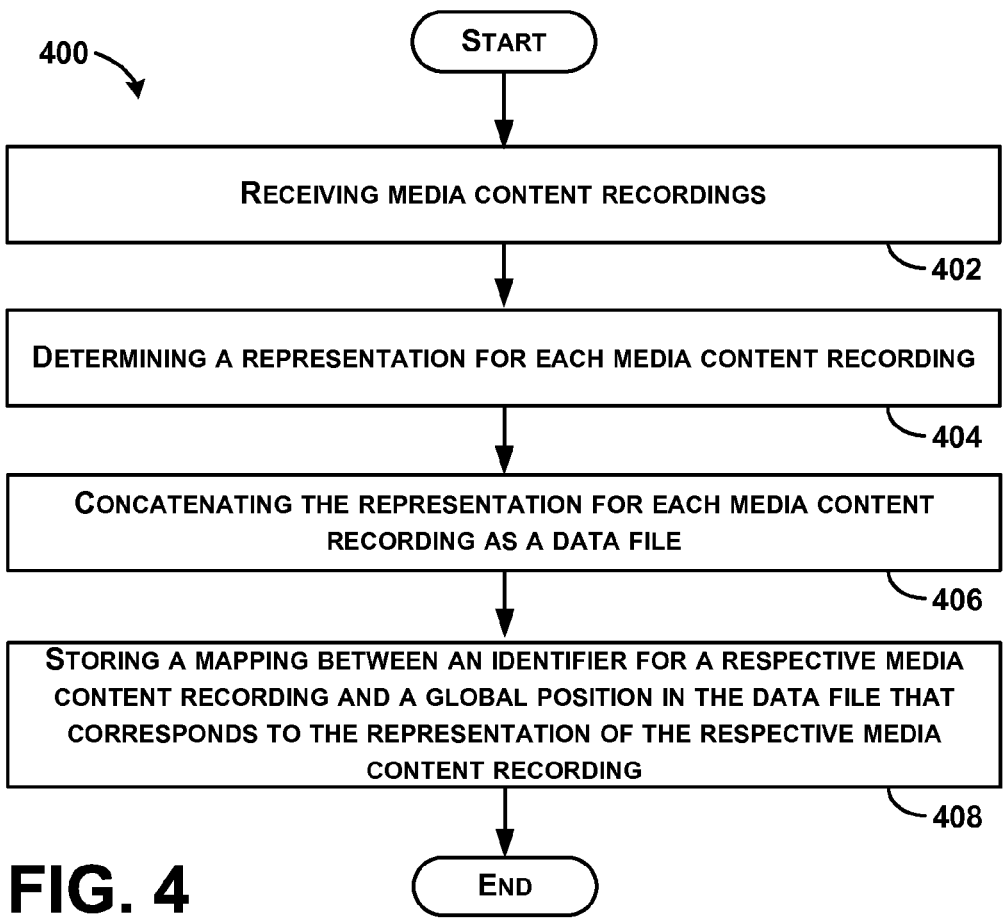
FIG. 4 shows a flowchart of an example method for providing a database of concatenated media content recordings.

FIG. 4 shows a flowchart of an example method 400 for providing a database of concatenated media content recordings. Method 400 shown in FIG. 4 presents an embodiment of a method that, for example, could be used with the system shown in FIG. 1, for example, and may be performed by a computing device (or components of a computing device) such as a client device or a server or may be performed by components of both a client device and a server.

At block 402, the method 400 includes receiving media content recordings. Media content recordings may include a number of songs, television programs, or any type of audio and/or video recordings.

At block 404, the method 400 includes determining a representation for each media content recording. In one example, fingerprints of a respective media content recording can be determined at respective positions within the respective media content recording, and the representation can be defined as the fingerprints. The representation may include additional or alternative information describing the media content recording such as any type of characteristic of the media content recording.

At block 406, the method 400 includes concatenating the representation for each media content recording as a data file. The data file has a concatenated or global timeline, and a given media content recording is represented as being located within the data file along the concatenated timeline at a given position or global position. In some examples, a buffer is provided between adjacent representations of media content recordings within the data file.

At block 408, the method 400 includes storing a mapping between an identifier for a respective media content recording and a global position in the data file that corresponds to the representation of the respective media content recording. The global position may thus correspond to a sound identifier of the given media content recording and a local landmark position of the fingerprint within the given media content recording.

In some examples, the method 400 also includes storing a list of global starting positions for media content recordings within the concatenated data file to segment a global timeline of the data file according to the media content recordings. Additionally, a list of boundaries between each representation of media content recording within the concatenated data file can be stored as well.

Example Search Methods

Within examples, a sample of media content is received, and a content recognition is performed by searching for matching content within the data file of concatenated media recordings. Any number of content identification matching methods may be used depending on a type of content being identified. As an example, for images and video content identification, an example video identification algorithm is described in Oostveen, J., et al., "Feature Extraction and a Database Strategy for Video Fingerprinting", Lecture Notes in Computer Science, 2314, (Mar. 11, 2002), 117-128, the entire contents of which are herein incorporated by reference. For example, a position of the video sample into a video can be derived by determining which video frame was identified. To identify the video frame, frames of the media sample can be divided into a grid of rows and columns, and for each block of the grid, a mean of the luminance values of pixels is computed. A spatial filter can be applied to the computed mean luminance values to derive fingerprint bits for each block of the grid. The fingerprint bits can be used to uniquely identify the frame, and can be compared or matched to fingerprint bits of a database that includes known media. Based on which frame the media sample included, a position into the video (e.g., time offset) can be determined.

As another example, for media or audio content identification (e.g., music), various content identification methods are known for performing computational content identifications of media samples and features of media samples using a database of known media. The following U.S. patents and publications describe possible examples for media recognition techniques, and each is entirely incorporated herein by reference, as if fully set forth in this description: Kenyon et al, U.S. Pat. No. 4,843,562; Kenyon, U.S. Pat. No. 4,450,531; Haitsma et al, U.S. Patent Application Publication No. 2008/0263360; Wang and Culbert, U.S. Pat. No. 7,627,477; Wang, Avery, U.S. Patent Application Publication No. 2007/0143777; Wang and Smith, U.S. Pat. No. 6,990,453; Blum, et al, U.S. Pat. No. 5,918,223; Master, et al, U.S. Patent Application Publication No. 2010/0145708.

As one example, fingerprints of a received sample of media content can be matched to fingerprints of known media content by generating correspondences between equivalent fingerprints in the concatenated data file to locate a media recording that has a largest number of linearly related correspondences, or whose relative locations of characteristic fingerprints most closely match the relative locations of the same fingerprints of the recording.

Figure 5:
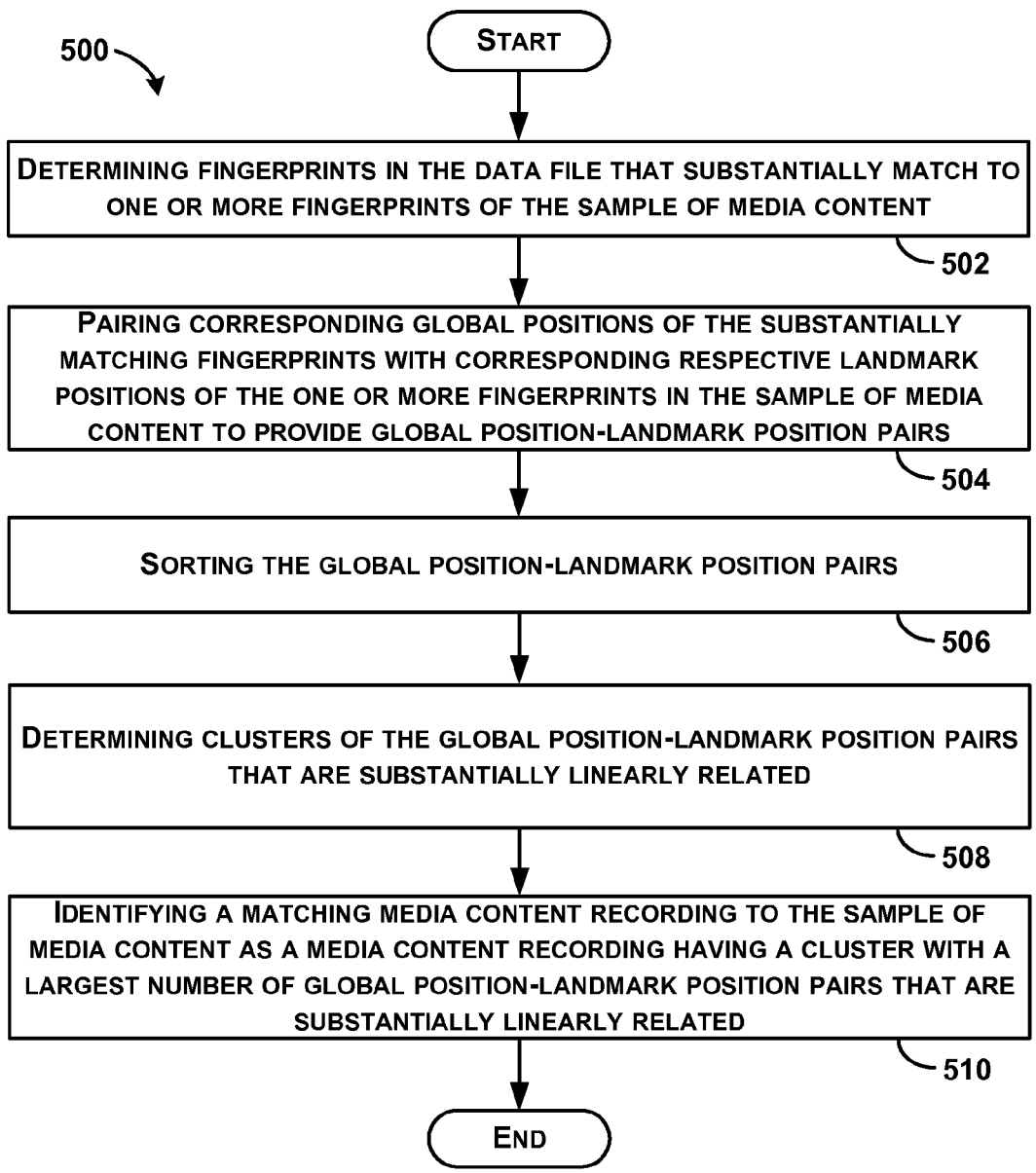
FIG. 5 shows a flowchart of an example method for performing a content recognition of a received sample of media content.

FIG. 5 shows a flowchart of an example method 500 for performing a content recognition of a received sample of media content. Method 500 shown in FIG. 5 presents an embodiment of a method that, for example, could be used with the system shown in FIG. 1, for example, and may be performed by a computing device (or components of a computing device) such as a client device or a server or may be performed by components of both a client device and a server.

At block 502, the method 500 includes determining fingerprints in the data file that substantially match to one or more fingerprints of the sample of media content. Fingerprints of the received sample of media content are created by processing a query media sample into a set of sample landmark and fingerprint pairs. The sample fingerprints are then used to retrieve matching KV pairs in the KV data file of concatenated media content, where the key K is a fingerprint and the value V is the payload, which in this case is a concatenated global position value.

At block 504, the method 500 includes pairing corresponding global positions of the substantially matching fingerprints with corresponding respective landmark positions of the one or more fingerprints in the sample of media content to provide global position-landmark position pairs. Thus, a retrieved global position value is paired with the sample landmark value. A time offset between the two positions may then be determined, for each global position-landmark position pair, by subtracting the global position value from the sample landmark value for matching fingerprints. Instead of storing the time offset pair differences (generated by subtracting corresponding time offsets from matching sample versus reference fingerprints) into many buckets where each bucket corresponds to a sound_ID index, all time offset differences can be stored in a single bucket.

At block 506, the method 500 includes sorting the global position-landmark position pairs. In other examples, the method 500 may include sorting the time offset differences generated from the global position-landmark position pairs. As one example, a radix sorting method may be used. Radix sorting algorithms are known in the art and discussed in D. E. Knuth, *The Art of Computer Programming*, Volume 3: Sorting and Searching, Reading, Mass.: Addison-Wesley, 1998, herein incorporated by reference. For instance, the radix sort includes a non-comparison linear-time sort that sorts data with integer keys by grouping keys by the individual digits which share the same significant position and value. In an example, if the time offset pair differences are contained within a 32-bit number, then the radix sort method may be conveniently implemented using commodity computational hardware and algorithms. For a large scale sorting of the entire set of time offset differences into one bucket, the radix sort may be economically advantageous over standard sorts on many small buckets, for example using conventional quicksort or heapsort methods. Following the sort, the time offset differences will be organized in order of ascending global position.

At block 508, the method 500 includes determining clusters of the global position-landmark position pairs that are substantially linearly related (or have some associated temporal correspondence). As one example, to verify if there is a match, a histogram scan can be performed to search for a significant peak in the sorted time offset difference data (e.g., number of data points occurring within a predetermined window width or number of points in a histogram bin). A presence of a peak in the number of points above a threshold within a window or bin can be interpreted as evidence for a match. Each occurrence of a significant peak in the long concatenated timeline of time offset differences indicates a candidate match, and candidate matches may be further processed individually to ascertain whether the candidates matches are exact, possibly using a different algorithm to verify a match. As one example, the time offset differences may be filtered using a predetermined window width of a few milliseconds.

At block 510, the method 500 includes identifying a matching media content recording to the sample of media content as a media content recording having a cluster with a largest number of global position-landmark position pairs that are substantially linearly related. Thus, the candidate match that has the most time offset differences within a predetermined window width can be deemed the winning matching file, for example.

In some examples, a buffer (e.g., blank space of several seconds worth of timeline) may be inserted between adjacent recordings in the concatenated data file to make it less ambiguous which media content recording was a match in case a sample offset into a particular song was negative, e.g., if the sample started before the song started then an offset mapping would put the recognized offset point in the previous song of the concatenated data file.

In some examples, the method 500 may further include determining a sound identifier of the matching media content recording based on the corresponding global position of the substantially matching fingerprints in the data file. For example, global positions of representations of the given media content recording in the data file can be associated or mapped to respective sound identifiers, and the mapping may be referenced when a winning global position is identified.

Figure 6:
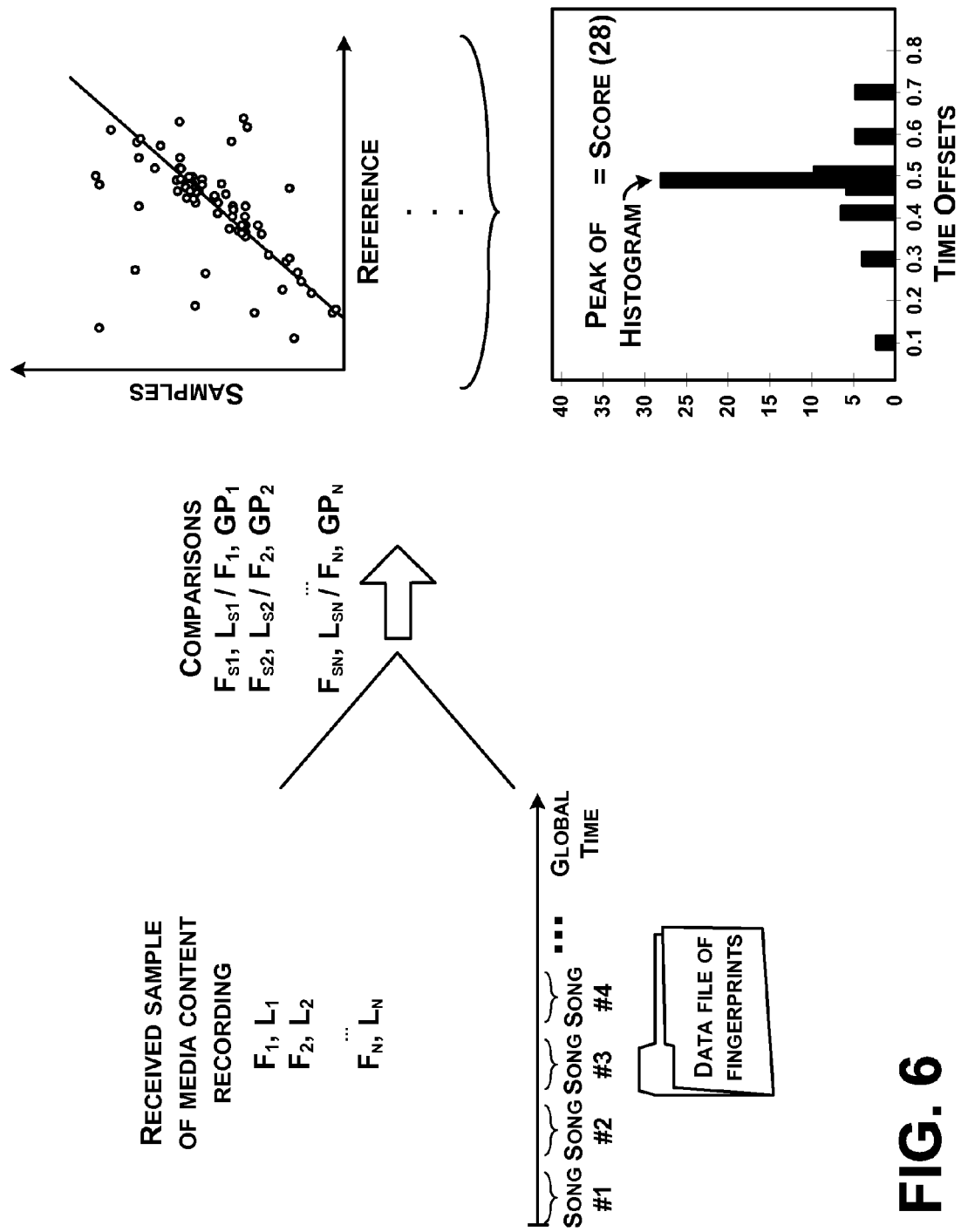
FIG. 6 is a diagram that conceptually illustrates performing a content recognition.

FIG. 6 is a diagram that conceptually illustrates performing a content recognition. Initially, fingerprint and landmark pairs ($F_1/L_1, F_2/L_2, \ldots, F_n/L_n$) can be determined and the fingerprints can be used to find matching fingerprints within the concatenated data file of known media content recordings. Global positions within the data file can be paired with landmarks in the sample for matching fingerprints. A scatter plot of landmarks of the sample and global positions of the known reference files can be determined After generating a scatter plot, clusters of landmark pairs having linear correspondences can be identified, and the clusters can be scored according to the number of pairs that are linearly related. A linear correspondence may occur when a statistically significant number of corresponding sample locations and reference file locations can be described with a linear equation, within an allowed tolerance, for example. An X-intercept of the linear equation may be a global time offset of the beginning of a matching media recording, and may be used for position detection, as well as for content identification. The file of the cluster with the highest statistically significant score, i.e., with the largest number of linearly related landmark pairs, is the winning file, and may be deemed the matching media file. In one example, to generate a score for a reference file, a histogram of offset values can be generated. The offset values may be differences between landmark time positions and the global positions where a fingerprint matches. FIG. 6 illustrates an example histogram of offset values. The reference file may be given a score that is related to the number of points in a peak of the histogram (e.g., score=28 in FIG. 6). The entire concatenated data file may be processed in this manner using a single bulk operation to determine histogram peaks and a score for each peak, and the media content recording corresponding to the global position resulting in the highest score may be determined to be a match to the sample.

In other examples, as additions or alternative to using a histogram, the Hough transform or RANSAC algorithms may be used to determine or detect a linear or temporal correspondence between time differences.

In some example, multiple simultaneous searches of the concatenated data file may be performed to determine a content recognition for multiple samples at the same time. For example, the time offset pair differences between landmarks and global positions for matching fingerprints, per sample, can be augmented by adding extra bits to the representation to indicate a sub-search index. For data representations of the time differences of up to 30 bits, an extra 2 high bits may be added to make the data representation an even 32 bits. The extra 2 bits may then index up to 4 separate searches. In general, if k extra most significant bits (MSBs) are added to the data representation, then $2^k$ sub-searches may be represented.

Instead of performing a number of independent sequential sample identifications, each search may be processed with time offset pair differences put into the single bucket, and augmented with a unique identifier using the upper k MSBs. The single bucket may thus be filled with data for up to $2^k$ searches over a large number of songs, and thus, buckets for many songs and sessions can be collapsed into one. A single sort operation can be performed to sort all the augmented time differences in the bucket. A histogram peak scan is carried out, as before, and the peaks are determined, and locations of the peaks may be interpreted as follows: the upper k bits of a peak indicate which sub-search the peak belongs to, and the lower bits indicate which song the sample matched.

Using examples described herein, a content recognition of a received sample of media content can be performed using a single array of data representing all known reference media content. Reference to media content identifiers can be removed from the searching process, and determined based on mappings to positions in the single array of data. A single or bulk global sort can be performed for simpler and more efficient sorting so that rather than minimizing an amount of material to sort (per sort), an amount of material is maximized. In some instances, a number of items searched can be increased by batching multiple queries, using bits to index batch entry, and a single sort then accomplishes separation of batches. A histogram scan or other peak determination methods can be performed to identify a winning match on a continuous timeline, and a media content identifier is retrieved after histogram searching by using reverse lookup, e.g. a binary search on an offset table.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   receiving a sample of media content; and
   performing, by a computing device, a content recognition of the sample of media content using a data structure including a concatenation of representations for each of a plurality of indexed media content recordings, wherein the data structure has associated sound identifiers per representations for each of the plurality of indexed media content recordings.

2. The method of claim 1, wherein the concatenation includes a plurality of respective representations per media content recording and arranged in sequential time order per media content recording in the data structure.

3. The method of claim 1, wherein the representation for a given media content recording comprises a set of fingerprints at respective landmark positions within the given media content recording, wherein each fingerprint corresponds to a global position within the data structure.

4. The method of claim 3, wherein performing the content recognition comprises:
   determining fingerprints in the data structure that match to one or more fingerprints of the sample of media content; and
   pairing corresponding global positions of the matching fingerprints with corresponding respective landmark positions of the one or more fingerprints in the sample of media content to provide global position-landmark position pairs.

5. The method of claim 4, further comprising:
   sorting the global position-landmark position pairs;
   determining clusters of the global position-landmark position pairs that are linearly related; and
   identifying a matching media content recording to the sample of media content as a media content recording having a cluster with a largest number of global position-landmark position pairs that are linearly related.

6. The method of claim 5, wherein sorting the global position-landmark position pairs comprises using a radix sorting method.

7. The method of claim 5, wherein a sound identifier of the given media content recording is associated with global positions of representations of the given media content recording in the data structure, and the method further comprises determining the sound identifier of the matching media content recording based on one of the corresponding global positions of the matching fingerprints in the data structure.

8. The method of claim 3, wherein a sound identifier of the given media content recording is associated with global positions of representations of the given media content recording in the data structure, and the method further comprises:
   determining fingerprints in the data structure that match to one or more fingerprints of the sample of media content;
   determining corresponding global positions of the matching fingerprints;
   determining time offset pair differences between the corresponding global positions and corresponding landmark positions of the one or more fingerprints of the sample of media content;
   identifying a matching media content recording to the sample of media content as a media content recording corresponding to a set of given global positions resulting in a largest number of matching time offset pair differences; and
   determining a respective sound identifier associated with the given global position.

9. The method of claim 1, wherein receiving the sample of media content comprises receiving, at the computing device, the sample of media content from an ambient environment of the computing device.

10. The method of claim 1, wherein receiving the sample of media content comprises receiving, at the computing device, the sample of media content from a second computing device.

11. The method of claim 1, further comprising determining an identification of the sample of media content based on a mapping between a sound identifier for a respective media content recording and a global position in the data structure that corresponds to a given representation of the respective media content recording that matches a portion of the sample of media content.

12. The method of claim 1, wherein performing the content recognition comprises:
   identifying, within the data structure of the concatenation of representations for each of the plurality of media content recordings, a matching representation to a respective representation of the sample of media content; and
   determining a global position in the data structure corresponding to the matching representation.

13. The method of claim 12, wherein the representations for each of the plurality of media content recordings have associated global starting positions within the data structure so as to segment a global timeline of the data structure according to the plurality of media content recordings, and the method further comprises determining a global starting position in the data structure associated with the matching representation at the global position.

14. The method of claim 13, further comprising determining a local position within a given media content recording corresponding to the sample of media content based on the global position and the global starting position.

15. The method of claim 1, further comprising:
   receiving a plurality of samples of media content, wherein the plurality of samples include samples of different media content; and
   performing, by the computing device, multiple simultaneous content recognitions of the plurality of samples of media content using the data structure.

16. The method of claim 15, wherein performing the multiple simultaneous content recognitions of the plurality of samples of media content using the data structure comprises:
   identifying, within the data structure of the concatenation of representations for each of the plurality of media content recordings, a matching representation for each of respective representations of the plurality of samples of media content;
   determining global positions in the data structure corresponding to the matching representation for each of the respective representations of the plurality of samples of media content;
   generating respective data representations for the global positions including, for each data representative, an identifier as upper bits and a given global position as lower bits; and
   processing the respective data representations to identify matching media recordings to the plurality of samples of media content, wherein the upper bits are indicative of a sub-search to the data representation belongs and the lower bits are indicative of a matching media content recording to which the respective sample matched.

17. A non-transitory computer readable medium having stored therein instructions, that when executed by a computing device, cause the computing device to perform functions comprising:
   receiving a sample of media content; and
   performing a content recognition of the sample of media content using a data structure including a concatenation of representations for each of a plurality of indexed media content recordings, wherein the data structure has associated sound identifiers per representations for each of the plurality of indexed media content recordings.

18. The non-transitory computer readable medium of claim 17, wherein the representation for a given media content recording comprises a set of fingerprints at respective landmark positions within the given media content recording, wherein each fingerprint corresponds to a global position within the data structure.

19. The non-transitory computer readable medium of claim 18, wherein performing the content recognition comprises:
   determining fingerprints in the data structure that match to one or more fingerprints of the sample of media content; and
   pairing corresponding global positions of the matching fingerprints with corresponding respective landmark positions of the one or more fingerprints in the sample of media content to provide global position-landmark position pairs.

20. The non-transitory computer readable medium of claim 19, wherein the functions further comprise:
   sorting the global position-landmark position pairs;
   determining clusters of the global position-landmark position pairs that are linearly related; and
   identifying a matching media content recording to the sample of media content as a media content recording having a cluster with a largest number of global position-landmark position pairs that are linearly related.

21. The non-transitory computer readable medium of claim 20, wherein sorting the global position-landmark position pairs comprises using a radix sorting method.

22. The non-transitory computer readable medium of claim 20, wherein a sound identifier of the given media content recording is associated with global positions of representations of the given media content recording in the data structure, and the functions further comprise determining the sound identifier of the matching media content recording based on one of the corresponding global positions of the matching fingerprints in the data structure.

23. The non-transitory computer readable medium of claim 18, wherein a sound identifier of the given media content recording is associated with global positions of representations of the given media content recording in the data structure, and the functions further comprise:
   determining fingerprints in the data structure that match to one or more fingerprints of the sample of media content;
   determining corresponding global positions of the matching fingerprints;
   determining time offset pair differences between the corresponding global positions and corresponding landmark positions of the one or more fingerprints of the sample of media content;
   identifying a matching media content recording to the sample of media content as a media content recording corresponding to a set of given global positions resulting in a largest number of matching time offset pair differences; and
   determining a respective sound identifier associated with the given global position.

24. The non-transitory computer readable medium of claim 17, wherein the functions further comprise determining an identification of the sample of media content based on a mapping between a sound identifier for a respective media content recording and a global position in the data structure that corresponds to a given representation of the respective media content recording that matches a portion of the sample of media content.

25. The non-transitory computer readable medium of claim 17, wherein performing the content recognition comprises:
   identifying, within the data structure of the concatenation of representations for each of the plurality of media content recordings, a matching representation to a respective representation of the sample of media content; and
   determining a global position in the data structure corresponding to the matching representation.

26. The non-transitory computer readable medium of claim 25, wherein the representations for each of the plurality of media content recordings have associated global starting positions within the data structure so as to segment a global timeline of the data structure according to the plurality of media content recordings, and the functions further comprise determining a global starting position in the data structure associated with the matching representation at the global position.

27. The non-transitory computer readable medium of claim 17, wherein the functions further comprise:
   receiving a plurality of samples of media content, wherein the plurality of samples include samples of different media content; and
   performing multiple simultaneous content recognitions of the plurality of samples of media content using the data structure.

28. The non-transitory computer readable medium of claim 27, wherein performing the multiple simultaneous content recognitions of the plurality of samples of media content using the data structure comprises:
   identifying, within the data structure of the concatenation of representations for each of the plurality of media content recordings, a matching representation for each of respective representations of the plurality of samples of media content;
   determining global positions in the data structure corresponding to the matching representation for each of the respective representations of the plurality of samples of media content;
   generating respective data representations for the global positions including, for each data representative, an identifier as upper bits and a given global position as lower bits; and
   processing the respective data representations to identify matching media recordings to the plurality of samples of media content, wherein the upper bits are indicative of a sub-search to the data representation belongs and the lower bits are indicative of a matching media content recording to which the respective sample matched.

29. A system comprising:
   at least one processor; and
   data storage configured to store instructions that when executed by the at least one processor cause the system to perform functions comprising:
      receiving a sample of media content;
      performing a content recognition of the sample of media content by matching a portion of the sample of media content to a respective media content recording in a data structure, wherein the data structure includes a concatenation of representations for each of a plurality of media content recordings, and wherein the data structure has associated identifiers per groupings of the representations for each of the plurality of media content recordings; and
      determining an identification of the sample of media content based on a mapping between an identifier for a respective media content recording in the data structure and a global position in the data structure that corresponds to a given representation of the respective media content recording that matches a portion of the sample of media content.

30. The system of claim 29, wherein the representation for a given media content recording comprises a set of fingerprints at respective landmark positions within the given media content recording, wherein each fingerprint corresponds to a global position within the data structure.

31. The system of claim 30, wherein performing the content recognition comprises:
   determining fingerprints in the data structure that match to one or more fingerprints of the sample of media content; and
   pairing corresponding global positions of the matching fingerprints with corresponding respective landmark positions of the one or more fingerprints in the sample of media content to provide global position-landmark position pairs.

32. The system of claim 31, wherein the functions further comprise:
   sorting the global position-landmark position pairs;
   determining clusters of the global position-landmark position pairs that are linearly related; and
   identifying a matching media content recording to the sample of media content as a media content recording having a cluster with a largest number of global position-landmark position pairs that are linearly related.

33. The system of claim 32, wherein a sound identifier of the given media content recording is associated with global positions of representations of the given media content recording in the data structure, and the functions further comprise determining the sound identifier of the matching media content recording based on one of the corresponding global positions of the matching fingerprints in the data structure.

34. The system of claim 30, wherein a sound identifier of the given media content recording is associated with global positions of representations of the given media content recording in the data structure, and the functions further comprise:
   determining fingerprints in the data structure that match to one or more fingerprints of the sample of media content;
   determining corresponding global positions of the matching fingerprints;
   determining time offset pair differences between the corresponding global positions and corresponding landmark positions of the one or more fingerprints of the sample of media content;
   identifying a matching media content recording to the sample of media content as a media content recording corresponding to a set of given global positions resulting in a largest number of matching time offset pair differences; and
   determining a respective sound identifier associated with the given global position.

35. The system of claim 29, wherein performing the content recognition comprises:
   identifying, within the data structure of the concatenation of representations for each of the plurality of media content recordings, a matching representation to a respective representation of the sample of media content; and
   determining a global position in the data structure corresponding to the matching representation.

36. The system of claim 35, wherein the representations for each of the plurality of media content recordings have associated global starting positions within the data structure so as to segment a global timeline of the data structure according to the plurality of media content recordings, and the functions further comprise determining a global starting position in the data structure associated with the matching representation at the global position.

37. The system of claim 29, wherein the functions further comprise:
   receiving a plurality of samples of media content, wherein the plurality of samples include samples of different media content; and
   performing multiple simultaneous content recognitions of the plurality of samples of media content using the data structure.

38. The system of claim 37, wherein performing the multiple simultaneous content recognitions of the plurality of samples of media content using the data structure comprises:
   identifying, within the data structure of the concatenation of representations for each of the plurality of media content recordings, a matching representation for each of respective representations of the plurality of samples of media content;
   determining global positions in the data structure corresponding to the matching representation for each of the respective representations of the plurality of samples of media content;
   generating respective data representations for the global positions including, for each data representative, an identifier as upper bits and a given global position as lower bits; and
   processing the respective data representations to identify matching media recordings to the plurality of samples of media content, wherein the upper bits are indicative of a sub-search to the data representation belongs and the lower bits are indicative of a matching media content recording to which the respective sample matched.

* * * * *